US011014619B2

(12) United States Patent
Han et al.

(10) Patent No.: US 11,014,619 B2
(45) Date of Patent: May 25, 2021

(54) INTERNALLY-TENSIONED INFLATABLE DEVICE FOR ACTIVE FLOW CONTROL DRAG REDUCTION OR STABILITY INCREASE

(71) Applicant: GM GLOBAL TECHNOLOGY OPERATIONS LLC, Detroit, MI (US)

(72) Inventors: Taeyoung Han, Bloomfield Hills, MI (US); Wonhee M. Kim, Royal Oak, MI (US); Paul W. Alexander, Ypsilanti, MI (US); Chih-hung Yen, Bloomfield Hills, MI (US); Bahram Khalighi, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 16/566,374

(22) Filed: Sep. 10, 2019

(65) Prior Publication Data

US 2021/0070382 A1 Mar. 11, 2021

(51) Int. Cl.
*B62D 37/02* (2006.01)
*B62D 35/02* (2006.01)
*B62D 35/00* (2006.01)

(52) U.S. Cl.
CPC ........... *B62D 37/02* (2013.01); *B62D 35/007* (2013.01)

(58) Field of Classification Search
CPC .... B62D 35/00; B62D 35/001; B62D 35/002; B62D 35/004; B62D 35/005; B62D 35/007; B62D 35/008; B62D 35/02; B62D 37/02; B60R 19/20; B60R 19/205
USPC ............ 296/180.1–180.5; 180/903; 293/118, 293/119
See application file for complete search history.

(56) References Cited

U.S. PATENT DOCUMENTS 2,979,287 A * 4/1961 Ross .................... B64C 23/005 244/219
3,138,506 A * 6/1964 Ross .................... B29C 70/865 156/147
4,292,701 A 10/1981 Woychick
4,826,715 A 5/1989 Lee
5,152,018 A 10/1992 Lea
9,821,862 B2 11/2017 Han et al.
10,398,235 B2 9/2019 Lin et al.
2004/0188988 A1 9/2004 Wipasuramonton et al.
2006/0288489 A1 12/2006 Yang
2007/0046001 A1 3/2007 Hirata
2007/0200329 A1 8/2007 Ma
2008/0296946 A1 12/2008 Reynolds et al.
2009/0320211 A1 12/2009 Lau
(Continued)

OTHER PUBLICATIONS

U.S. Appl. No. 15/954,788, filed Apr. 14, 2018, Khalighi et al.
(Continued)

*Primary Examiner* — Dennis H Pedder

(57) ABSTRACT

An inflatable active flow control device includes a first surface, a second surface, and a spring including one end connected to the first surface and an opposite end connected to the second surface. A flexible material is connected to both the first surface and the second surface around the spring, defines an inflatable internal volume, and includes a plurality of threads extending between opposing inner surfaces of the flexible material at spaced locations through the inflatable internal volume.

18 Claims, 4 Drawing Sheets

(56) References Cited

U.S. PATENT DOCUMENTS

| | | | | |
|---|---|---|---|---|
| 2011/0068604 | A1* | 3/2011 | Neuberger | G01C 21/26 296/180.2 |
| 2014/0101861 | A1 | 4/2014 | Gowda et al. | |
| 2015/0201760 | A1 | 7/2015 | Lin et al. | |
| 2017/0042338 | A1 | 2/2017 | Yang | |
| 2017/0106830 | A1 | 4/2017 | Rohn et al. | |
| 2018/0065690 | A1 | 3/2018 | Han et al. | |
| 2018/0281874 | A1 | 10/2018 | Han et al. | |
| 2018/0362142 | A1* | 12/2018 | V zquez Castro | B64C 3/30 |
| 2019/0195427 | A1 | 6/2019 | Alexander et al. | |
| 2019/0299909 | A1 | 10/2019 | Alexander et al. | |

OTHER PUBLICATIONS

U.S. Appl. No. 15/970,221, filed May 3, 2018, Dadheech et al.
U.S. Appl. No. 16/114,423, filed Aug. 28, 2018, Alexander et al.
U.S. Appl. No. 16/227,177, filed Dec. 20, 2018, Han et al.
U.S. Appl. No. 16/443,029, filed Jun. 17, 2019, Han et al.
U.S. Appl. No. 16/566,584, filed Sep. 10, 2019, Kim et al.
U.S. Appl. No. 16/566,631, filed Sep. 10, 2019, Kim et al.
U.S. Appl. No. 16/566,683, filed Sep. 10, 2019, Kim et al.

* cited by examiner 121
150-1
150-2
150-L
122
121
126

118
132
126
122
121
50
122
121
126
114
116
140
142

118
132
121
126
122
121
122
126
50
114
116
140
142

INTERNALLY-TENSIONED INFLATABLE DEVICE FOR ACTIVE FLOW CONTROL DRAG REDUCTION OR STABILITY INCREASE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to devices for actively reducing aerodynamic drag and/or increasing stability of vehicles.

Vehicles may include fixed diffuser panels and/or spoilers to reduce aerodynamic drag, which increases fuel economy. These devices may also be used to improve aerodynamic stability by providing down force and/or controlling down force when the vehicle is exposed to severe and variable side winds. However, fixed diffuser panels and/or spoilers may be less desirable in some instances due to poor aesthetics.

SUMMARY

An inflatable active flow control device includes a first surface, a second surface, and a spring including one end connected to the first surface and an opposite end connected to the second surface. A flexible material is connected to both the first surface and the second surface around the spring, defines an inflatable internal volume, and includes a plurality of threads extending between opposing inner surfaces of the flexible material at spaced locations through the inflatable internal volume.

In other features, the first surface is fixed to a body of a vehicle and the second surface comprises an exterior panel of the vehicle. The first surface includes an inlet to receive a pressurized fluid. The flexible material is airtight. The flexible material includes drop stitch fabric. The plurality of threads are made of nylon.

An aerodynamic adjustment system includes the inflatable active flow control device, a pressurized fluid source, and a valve selectively connecting the pressurized fluid source to the inlet.

In other features, a controller is configured to selectively deploy the inflatable active flow control device or retract the inflatable active flow control device based on at least one of a speed of the vehicle, a yaw rate of the vehicle, a driving mode of the vehicle, wind speed, wind direction, GPS data for the vehicle, and/or weather data.

In other features, a controller is configured to selectively deploy of the inflatable active flow control device in a drag reducing position and a stability increasing position. The flexible material comprises L layers, where L in an integer. At least one of the L layers comprises a drop stitch fabric.

An inflatable active flow control device includes an aerodynamic surface and an inflatable device connected to the aerodynamic surface. The inflatable device includes a flexible material attached to the aerodynamic surface and defining an inflatable inner volume and a plurality of threads extending through the inflatable inner volume at spaced locations between opposing inner surfaces of the flexible material. The plurality of threads are under tension when the inflatable inner volume is inflated.

In other features, the inflatable device further includes an attachment surface attached to the flexible material. A spring includes one end connected to the aerodynamic surface and an opposite end connected to the attachment surface. The flexible material is connected to both the aerodynamic surface and the attachment surface around the spring. The attachment surface is attached to a body of a vehicle and the aerodynamic surface comprises an exterior panel of the vehicle. At least one of the flexible material and the attachment surface includes an inlet to receive pressurized fluid. The inflatable internal volume is airtight. The flexible material and the plurality of threads include a drop stitch fabric.

An aerodynamic adjustment system includes the inflatable active flow control device, a pressurized fluid source and a valve selectively connecting the pressurized fluid source to the inlet.

In other features, a controller is configured to selectively deploy the inflatable active flow control device in a drag reducing position and a stability increasing position based on at least one of vehicle data, global positioning system data and weather data.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the foregoing description of an inflatable active flow control device will be described in the context of a passenger vehicle, the inflatable active flow control device can be used in other active flow control applications for other types of vehicles and/or non-vehicle applications.

An inflatable active flow control device includes an internally-tensioned, inflatable structure that can deploy from a retracted position when needed to reduce drag and/or improve vehicle stability. For example only, the inflatable active flow control device can be used to implement a deployable underbody diffuser and/or a deployable rear spoiler that are activated at higher vehicle speeds and retracted at lower vehicle speeds. The deployable diffuser and/or rear spoiler can be used to improve fuel economy and/or increase stability without adversely impacting vehicle aesthetics.

As described further below, the internally-tensioned inflatable structure according to the present disclosure simplifies an actuation mechanism used in active flow control devices such as underbody diffusers and/or spoilers and provides sufficient strength to sustain active flow control loads.

Figure 1:
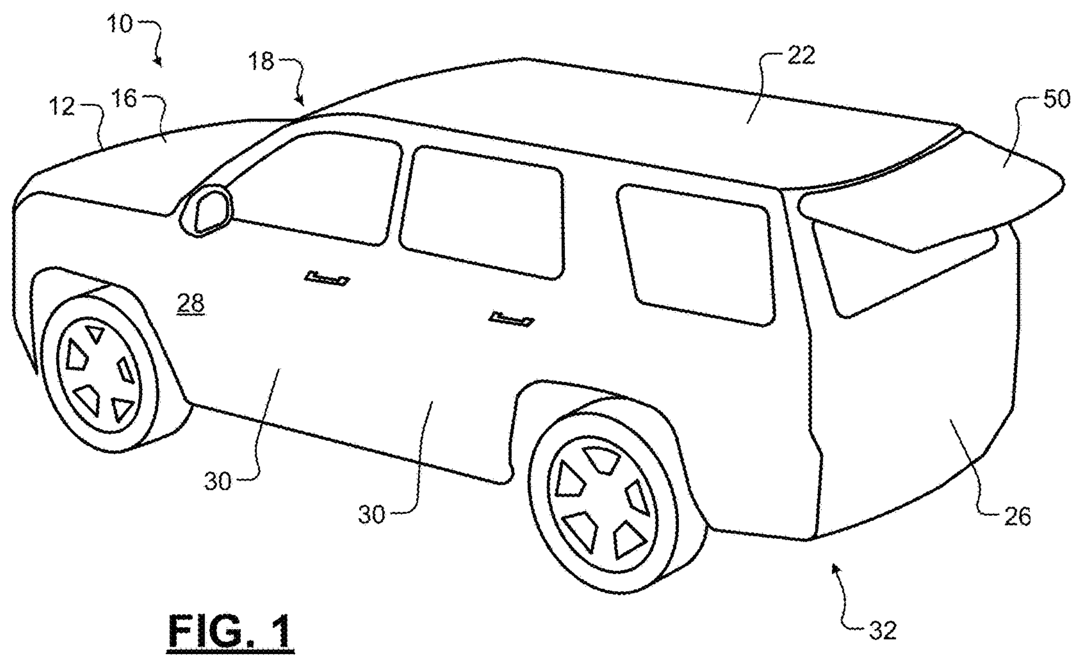
FIG. 1 is a rear perspective view of an example of a vehicle including an inflatable active flow control device according to the present disclosure.
Figure 2:
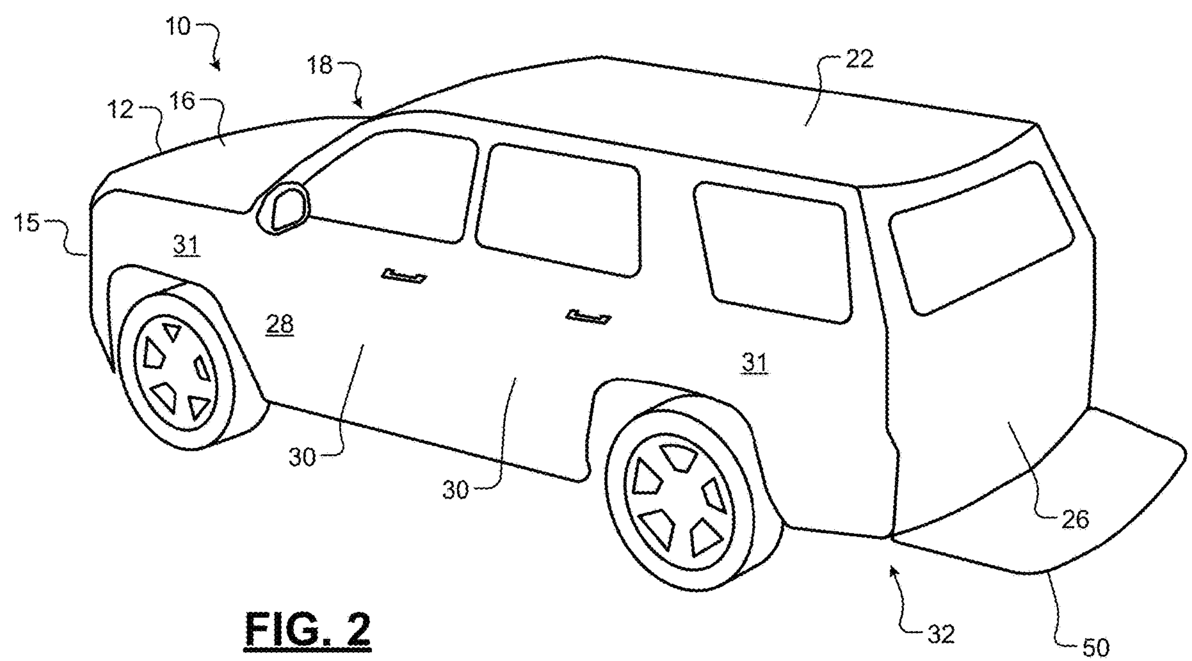
FIG. 2 is a rear perspective view of another example of a vehicle including an inflatable active flow control device according to the present disclosure.

Referring now to FIGS. 1 and 2, non-limiting examples of deployment locations are shown for the inflatable active flow control device according to the present disclosure. A vehicle 10 includes a body 12 including a front bumper and/or grille 15, a hood 16 and a windscreen 18. The body 12 further includes a roof 22 and side surfaces 28 including one or more doors 30 and/or fenders 31. A trunk or rear door 26 allow access to a rear of the vehicle 10. The vehicle 10 also includes an underside surface 32.

An inflatable active flow control device 50 is attached to the body 12 of the vehicle 10 in one or more locations. The inflatable active flow control device 50 is deployed under one or more conditions and/or sets of conditions to reduce drag and/or increase vehicle stability. The inflatable active flow control device 50 is retracted in other conditions to improve vehicle aesthetics. In some examples, the inflatable active flow control device 50 extends in a rearward direction from the roof 22 (FIG. 2). In other examples, the active flow control device 50 extends in a forward, rearward, upward and/or downward direction from another portion of the body 12 such as but not limited to the front bumper or grille 15, doors, side mirrors, the trunk or rear door 26, the fenders 31, the side surfaces 28 and/or the underside surface 32. In FIG. 2, the active flow control device 50 extends rearward from the underside surface 32 of the body 12.

Figure 3C:
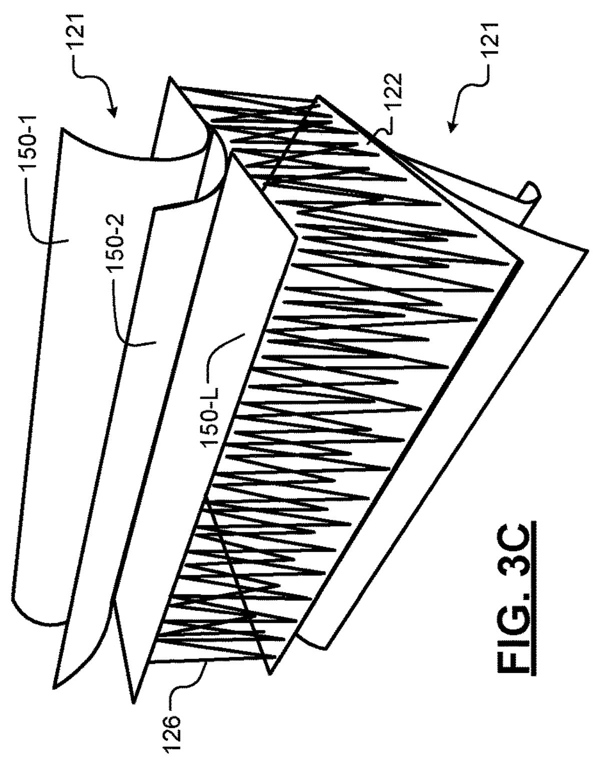
FIG. 3C is a perspective view of a flexible material including a fabric with drop stitch threads extending through an inflatable internal volume between opposing surfaces of the fabric according to the present disclosure.
Figure 3A:
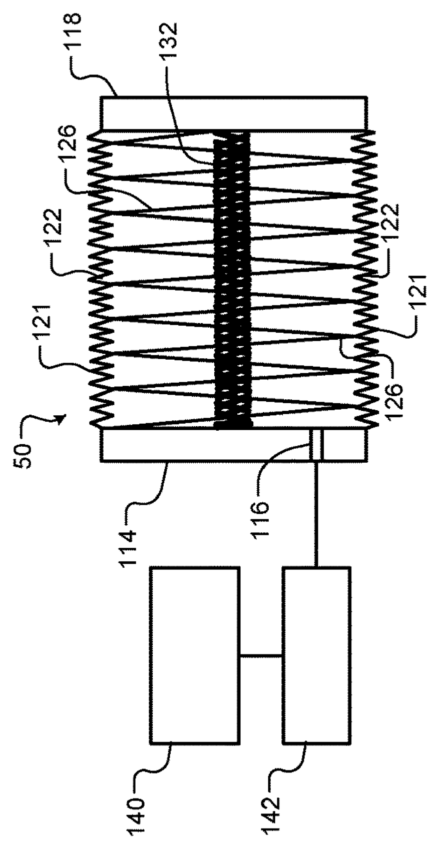
FIG. 3A is a side cross-sectional view and functional block diagram of a system including the inflatable active flow control device in a retracted state according to the present disclosure.

Referring now to FIG. 3A, the inflatable active flow control device 50 is shown in a retracted state. The inflatable active flow control device 50 includes a first surface 114 including an inlet 116 and a second surface 118. In some examples, the second surface 118 corresponds to an exterior panel of the vehicle 10. The first surface 114 can be a separate panel that is attached to the body 12. Alternately, the first surface 114 can be part of the body 12. The inflatable active flow control device 50 further includes a flexible material 121 including one or more layers. An inner surface 122 of the flexible material 121 is connected by threads 126 to an opposing portion of the inner surface 122. While the inlet 116 is shown on the first surface 114, the inlet 116 can be arranged on the flexible material 121. In some examples, the flexible material 121 is airtight or leak resistant.

In some examples, the flexible material 121 includes a layer of drop needle fabric. Drop needle fabric is made using one or more needles that are configured to drop a stitch at regular or irregular intervals during knitting of the fabric such that the threads are not interwoven. Opposite ends of the threads are attached to opposing surfaces of the fabric to provide a plurality of spaced internal tension elements. The threads are loose between the opposite ends of the thread. The inflatable active flow control device 50 further includes a spring 132 that is arranged between the first surface 114 and the second surface 118.

The inlet 116 is connected by an optional valve 142 and conduit to a pressurized fluid source 140 supplying a pressurized liquid such as hydraulic oil or a pressurized gas such as compressed air. In some examples, the pressurized fluid source 140 and the optional valve 142 include a compressor with an internal valve supplying compressed air, although other types of pressurized fluid sources can be used. For example, a storage chamber with air, hydraulic oil and/or another gas or fluid at a pressure higher than atmospheric pressure can be used. In some examples, the valve 142 is a two-way valve. In other examples, the valve 142 is a three-way valve that selectively connects the pressurized fluid source 140 to the inflatable volume for deployment or connects the inflatable volume to atmosphere for retraction.

The flexible material 121 is relatively loose between the threads 126 when in the retracted state since the spring 132 is in an unbiased state or slightly stretched state (as limited by the threads 126 and/or the flexible material 121).

Figure 3B:
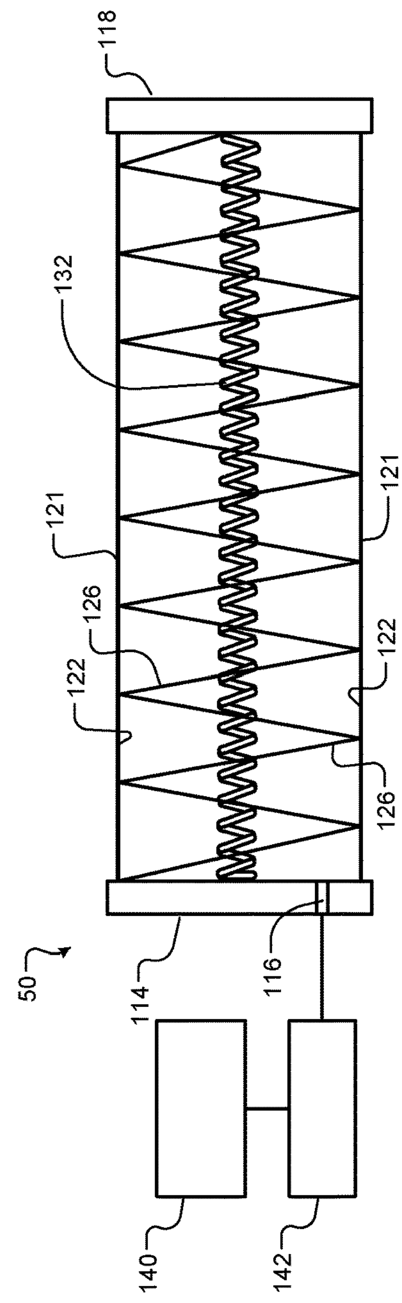
FIG. 3B is a side cross-sectional view and functional block diagram of a system including the inflatable active flow control device in a deployed state according to the present disclosure.

Referring now to FIG. 3B, the inflatable active flow control device 50 is shown in a deployed state. Gas from the pressurized fluid source 140 is supplied via the valve 142 through the inlet 116 into an inflatable volume defined between the first surface 114, the fabric surface 122 and the second surface 118. As the pressure within the volume increases, the second surface 118 moves away from the first surface 114 to deploy the inflatable active flow control device 50. The amount of movement is generally proportional to the pressure that is supplied. The flexible material 121 is relatively tight between the threads 126 since the spring 132 is in a stretched state (due to pressure from the pressurized fluid).

In some examples, the flexible material 121 is sufficiently flexible to allow the inflatable active flow control device 50 to retract and deploy. The flexible material 121 is sufficiently airtight to allow pressurized fluid to inflate the inflatable active flow control device 50 and maintain the deployed shape. In some examples, the pressurized fluid source 140 periodically or continuously maintains the higher pressure in the volume while the inflatable active flow control device 50 is deployed. In other examples, the pressurized fluid source 140 supplies a sufficient amount of pressurized fluid for deployment and then the valve is closed. In other words, the flexible material 121 is sufficiently airtight that the pressurized fluid source 140 does not need to continue to supply pressurized fluid to maintain deployment.

Referring now to FIG. 3C, the flexible material 121 may include one or more layers 150-1, 150-2, . . . and 150-L (collectively layers 150), where L is an integer greater than zero, that are attached together. The layers 150 can be of the same material or two or more different materials. In some examples, an inner layer of the flexible material 121 includes drop stitch fabric with threads connecting opposing surfaces. Other layers 150 may include an airtight layer made of plastic or other airtight or leak resistant material.

Figure 3E:
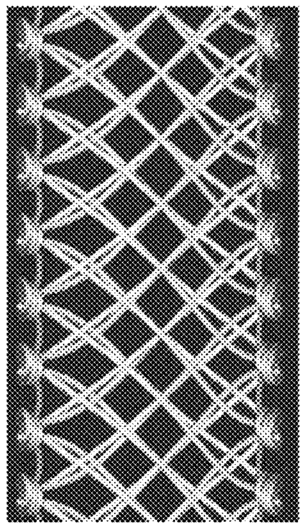
FIGS. 3D and 3E illustrate examples of drop stitch thread patterns according to the present disclosure.
Figure 3D:
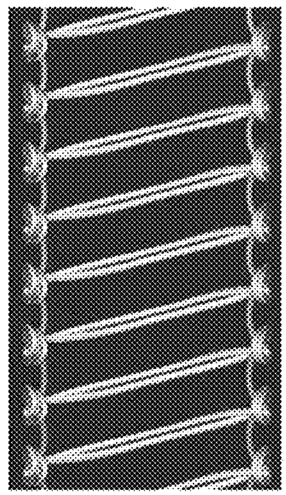

Referring now to FIGS. 3D and 3E, various examples of drop stitch thread patterns are shown. In FIG. 3D, a simple thread pattern with one or two drop threads connected to opposing surfaces of the flexible material 121 can be used without braiding the threads 126. In FIG. 3E, more complex patterns with braided threads can be used.

Figure 4:
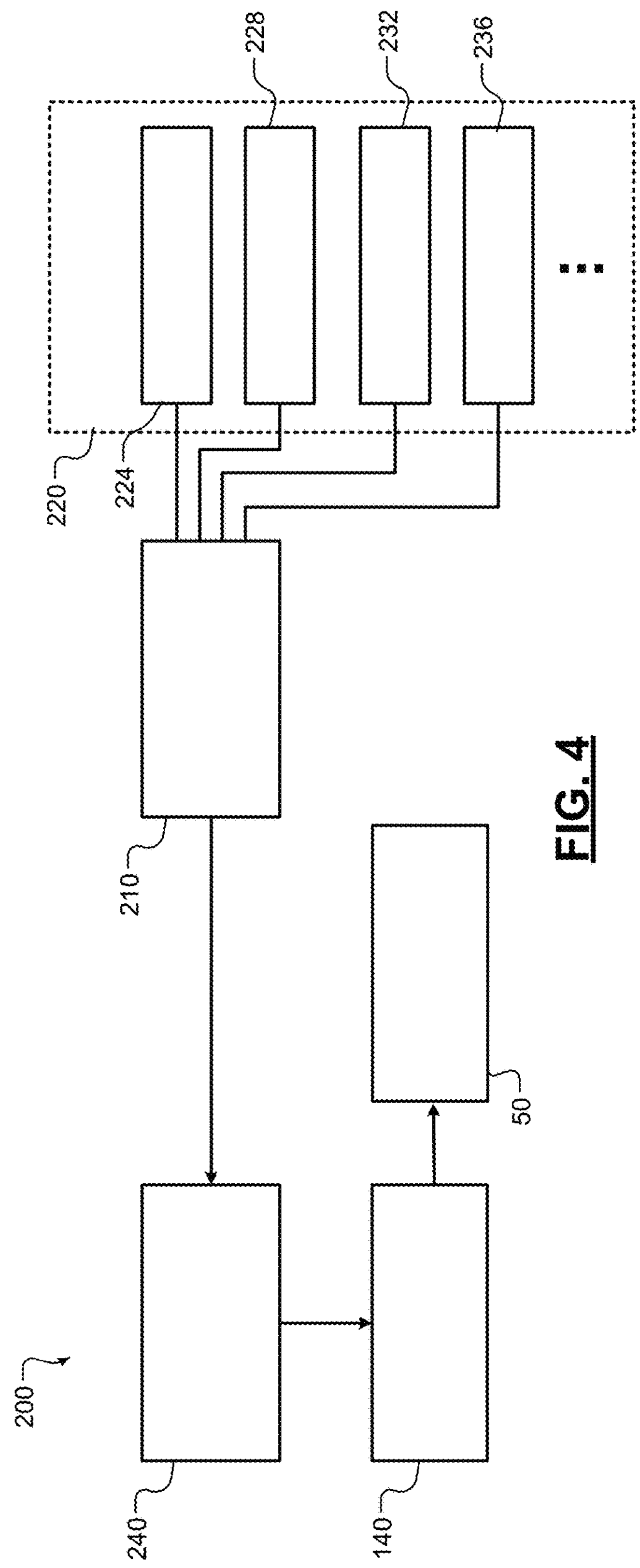
FIG. 4 is a functional block diagram of a control system for controlling the inflatable active flow control device according to the present disclosure.

Referring now to FIG. 4, a control system 200 for controlling the inflatable active flow control device 50 is shown. The control system 200 includes a vehicle controller 210 that controls a vehicle component such as an engine, transmission or other vehicle component. The vehicle controller 210 is connected to one or more vehicle sensors 220 and/or receives data from one or more vehicle sensors 220. In some examples, the one or more vehicle sensors 220 include a wind speed sensor and/or wind direction sensor (both identified at 224), a global positioning system (GPS) 228, a wheel speed sensor 232, a yaw rate sensor 236 and/or other vehicle sensor. In some examples, the deployment position of the active flow control device 50 can be selected based on a driving mode selected by the driver. For example, the active flow control device 50 can be deployed in a stability increasing position when sport or track mode are selected. For example, the active flow control device 50 can be deployed in a drag reducing position when an economy mode is selected.

An active flow control device controller 240 communicates with or forms part of the vehicle controller 210. The active flow control device controller 240 receives data from the vehicle controller 210 or a vehicle bus. In some examples, the data includes vehicle speed, yaw rate, wind speed, wind direction, GPS data, driving mode, and/or weather data such as precipitation information (snow, sleet, rain, etc.).

The active flow control device controller 240 selects a deployed state for the active flow control device 50 to provide increased stability or reduced drag based upon the data. The active flow control device controller 240 selectively supplies pressurized fluid to the active flow control device 50 to deploy or retract the active flow control device 50. When the pressurized fluid is released by the valve, the spring 132 contracts and the active flow control device 50 returns towards the retracted state.

Figure 5:
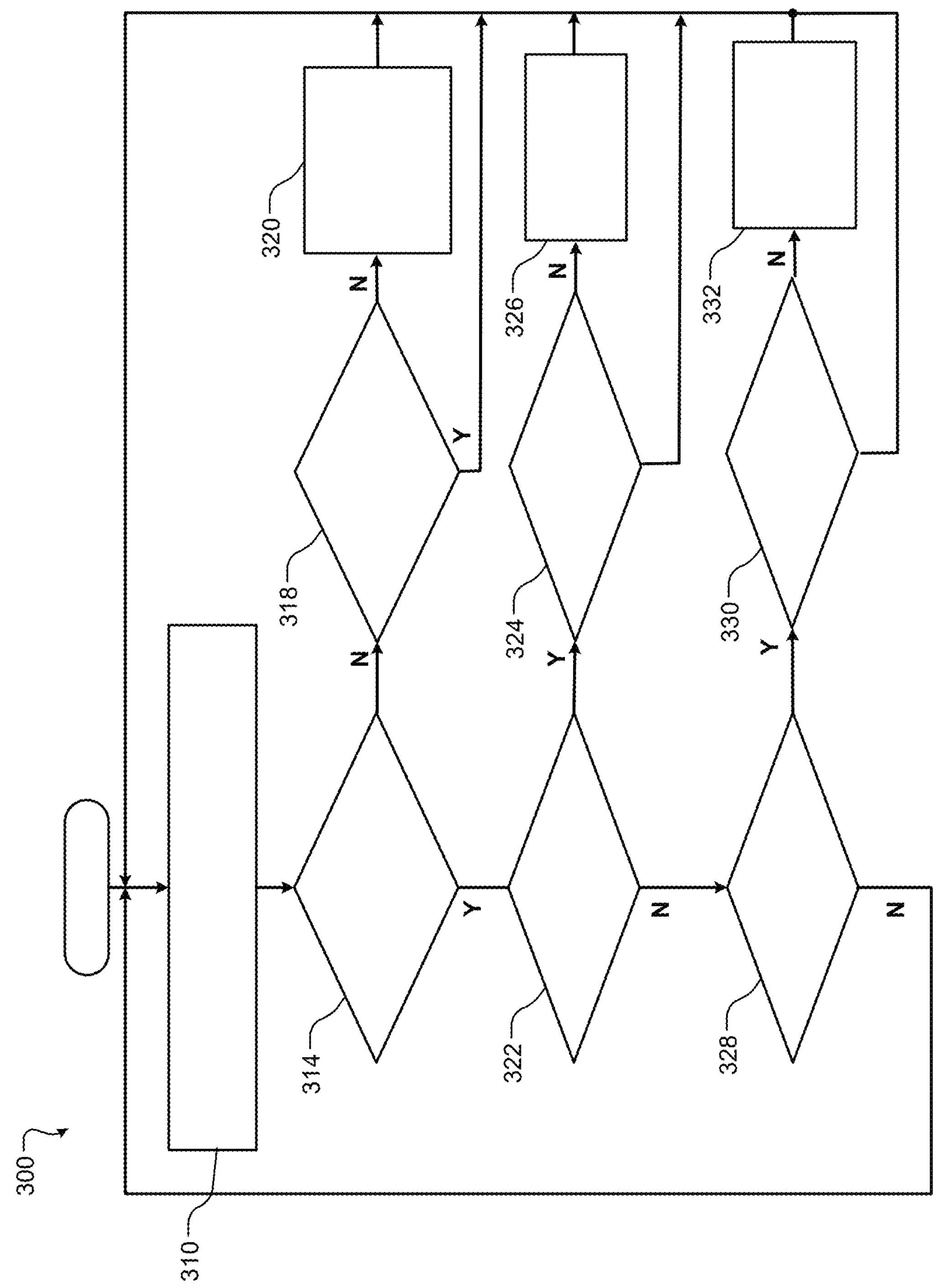
FIG. 5 is a flowchart of a method for deploying and/or retracting the inflatable active flow control device according to the present disclosure.

Referring now to FIG. 5, a method 300 for deploying the inflatable active flow control device 50 is shown. At 310, vehicle data, weather data and/or location data is sampled and compared to one or more enabling conditions.

At 314, the method determines whether the enabling conditions are met for deploying the inflatable active flow control device. In some examples, the enabling conditions may include vehicle speed greater than a predetermined speed such as 30 mph or another value, presence or absence of certain weather conditions such as rain or snow, yaw rates above or below predetermined values, a driving mode selected by the driver, etc.

If 314 is false, the method determines whether the active flow control device is retracted at 318. If 318 is false, the method retracts the inflatable active flow control device at 320 and the method returns to 310. If 318 is true, the method returns to 310.

If 314 is false, the method continues at 322 and determines whether drag reduction is needed. If 322 is true, method continues at 324 and determines whether the inflatable active flow control device is already in the drag reducing configuration. If 324 is false, the inflatable active flow control device is configured in the drag reducing position at 326. The method continues from 324 if true and 326 to 310.

If 322 is true, the method determines at 328 whether conditions for the stability configuration are met. If 328 is true, the method continues at 330 and determines whether the inflatable active flow control device is already deployed in the stability increasing configuration. If 330 is false, the inflatable active flow control device is deployed in the stability increasing position at 332. The method continues from 330 (if true) and 332 to 310. The method may wait a predetermined delay before repeating the loop shown in FIG. 5 to provide hysteresis.

In other examples, one or more of the conditions may be averaged over a predetermined time period to provide hysteresis. For example, vehicle speed may input to a mathematical function or averaged over a predetermined period to prevent toggling.

As can be appreciated, when the active flow control device is deployed at the rear of the vehicle, the active flow control device effectively suppresses vortices originating from the vehicle, which reduces aerodynamic drag. In other words, the active flow control device is useful in streamlining the vehicle and reducing the coefficient of drag, which increases fuel economy.

In some examples, the inner volume of the inflatable active flow control device 50 is pressurized to a pressure in a predetermined range from 20 to 50 psi, although other pressure ranges can be used. Optimum deployment positions for the flow control device can be determined using flow visualization and/or computational fluid dynamics (CFD).

While the stability position is described above as a single stability position, the stability position can include one or more stability positions or a stability position in a predetermined range of stability positions. The particular stability position can be selected based on one or more of the conditions and/or the data.

While the drag position is described above as a single drag position, the drag position can include one or more drag positions or a drag position in a predetermined range of drag positions. The particular drag position can be selected based on one or more conditions and/or the data.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An inflatable active flow control device, comprising:

a first surface;

a second surface;

a spring including one end connected to the first surface and an opposite end connected to the second surface; and a flexible material connected to both the first surface and the second surface around the spring, defining an inflatable internal volume, and including a plurality of threads extending between opposing inner surfaces of the flexible material at spaced locations through the inflatable internal volume.

2. The inflatable active flow control device of claim 1, wherein the first surface is fixed to a body of a vehicle and the second surface comprises an exterior panel of the vehicle.

3. The inflatable active flow control device of claim 2, wherein the first surface includes an inlet to receive a pressurized fluid.

4. The inflatable active flow control device of claim 1, wherein the flexible material is airtight.

5. The inflatable active flow control device of claim 1, wherein the flexible material includes drop stitch fabric.

6. The inflatable active flow control device of claim 1, wherein the plurality of threads are made of nylon.

7. An aerodynamic adjustment system comprising:

the inflatable active flow control device of claim 3;

a pressurized fluid source; and a valve selectively connecting the pressurized fluid source to the inlet.

8. The aerodynamic adjustment system of claim 7, further comprising:

a controller configured to selectively deploy the inflatable active flow control device or retract the inflatable active flow control device based on at least one of a speed of the vehicle, a yaw rate of the vehicle, a driving mode of the vehicle, wind speed, wind direction, GPS data for the vehicle, and/or weather data.

9. The aerodynamic adjustment system of claim 7, further comprising:

a controller configured to selectively deploy of the inflatable active flow control device in a drag reducing position and a stability increasing position.

10. The aerodynamic adjustment system of claim 7, wherein the flexible material comprises L layers, where L in an integer, and wherein at least one of the L layers comprises a drop stitch fabric.

11. An inflatable active flow control device, comprising:

an aerodynamic surface;

an inflatable device connected to the aerodynamic surface and including:

a flexible material attached to the aerodynamic surface and defining an inflatable inner volume; and a plurality of threads extending through the inflatable inner volume at spaced locations between opposing inner surfaces of the flexible material, wherein the plurality of threads are under tension when the inflatable inner volume is inflated;

an attachment surface attached to the flexible material; and a spring including one end connected to the aerodynamic surface and an opposite end connected to the attachment surface, wherein the flexible material is connected to both the aerodynamic surface and the attachment surface around the spring.

12. The inflatable active flow control device of claim 11, wherein the attachment surface is attached to a body of a vehicle and the aerodynamic surface comprises an exterior panel of the vehicle.

13. The inflatable active flow control device of claim 11, wherein at least one of the flexible material and the attachment surface includes an inlet to receive pressurized fluid.

14. The inflatable active flow control device of claim 11, wherein the inflatable inner volume is airtight.

15. The inflatable active flow control device of claim 11, wherein the flexible material and the plurality of threads include a drop stitch fabric.

16. An aerodynamic adjustment system comprising:

the inflatable active flow control device of claim 13;

a pressurized fluid source; and a valve selectively connecting the pressurized fluid source to the inlet.

17. The aerodynamic adjustment system of claim 16, further comprising:

a controller configured to selectively deploy the inflatable active flow control device in a drag reducing position and a stability increasing position based on at least one of vehicle data, global positioning system data and weather data.

18. An aerodynamic adjustment system for a vehicle, comprising:

an inflatable active flow control device, comprising:

a first surface including an inlet;

a second surface;

a spring including one end connected to the first surface and an opposite end connected to the second surface; and a flexible material connected to both the first surface and the second surface around the spring and defining an inflatable internal volume, wherein the flexible material includes a drop stitch fabric including a plurality of threads extending between opposing inner surfaces of the flexible material through the inflatable internal volume at a plurality of spaced locations; and a pressurized fluid source;

a valve selectively connecting the pressurized fluid source to the inlet; and a controller configured to selectively control the valve to deploy the inflatable active flow control device and retract the inflatable active flow control device based on at least one of driving mode data, vehicle data, global positioning system data for the vehicle, and weather data.

* * * * *